United States Patent [19]

Sotos

[11] 4,189,809

[45] Feb. 26, 1980

[54] FASTENER DEVICE AND METHOD OF MANUFACTURING

[75] Inventor: Juan N. Sotos, Barcelona, Spain

[73] Assignee: Repla International S.A.H., Luxembourg, Luxembourg

[21] Appl. No.: 850,357

[22] Filed: Nov. 10, 1977

[30] Foreign Application Priority Data

Nov. 10, 1976 [ES] Spain .................................. 453.167

[51] Int. Cl.$^2$ ........................ A44B 17/00; B29F 3/00; B29C 17/02; B29C 17/14

[52] U.S. Cl. ................................. 24/204; 24/201 C; 264/145; 264/154; 264/177 R

[58] Field of Search ................... 264/145, 154, 177 R; 24/217, 216, 204, 201 C

[56] References Cited

U.S. PATENT DOCUMENTS

| | | | |
|---|---|---|---|
| 3,514,815 | 6/1970 | Evant | 24/201 C |
| 3,557,413 | 1/1971 | Engle | 24/201 C |
| 4,056,593 | 11/1977 | Albareda | 264/145 |
| 4,062,919 | 12/1977 | Rojahn | 264/145 |

*Primary Examiner*—James B. Lowe
*Attorney, Agent, or Firm*—Emory L. Groff, Jr.

[57] ABSTRACT

The invention relates to a method of manufacturing a fastener device by extrusion of a thermoplastic material through a shaped drawplate. The extruded strip includes a plurality of rows of longitudinal ribs connected at their bases by legs integral therewith at one end and connected at their edges to two contiguous longitudinally extending flat zones. The ribs are cut throughout their height and then the strip is stretched providing spaced apart ribs and openings in the base of the strip. The tops of the ribs are enlarged and are of greater width than the width of the openings thus providing a plurality of male and female connecting elements on the same strip.

7 Claims, 10 Drawing Figures

FASTENER DEVICE AND METHOD OF MANUFACTURING

The present invention relates to a method of manufacturing a fastener comprising a strip, one face of which is provided with a plurality of rows of fastener elements presenting shaped longitudinally extending ribs which are cut transversely to provide a plurality of individual fastener elements in each row of ribs.

It is already known to provide a process according to which a fastener strip is extruded from thermoplastic material, said strip including a flat base having one of it's faces provided with longitudinal ribs which are subsequently cut transversely in order to form protuberances which are regularly spaced apart on the strip. (note U.S. Pat. No. 4,056,593 issued Nov. 1, 1977)

The product thus obtained is capable of serving as a fastener element, the protuberances providing male elements entering into contact with and attaching to another appropriate material arranged opposite said male elements in order to assure the proper connection when the protuberances are pressed against said material and thus achieve the desired fastening arrangement.

The products manufactured according to the aforesaid process comprise a flat, continuous band which although providing a primary surface for adherence to other material, excludes any prospective use of the other surface of the band, which is not provided with protuberances, for attachment purposes by penetration of fastener elements across or through the strip.

Accordingly, the object of the present invention is to provide a manufacturing process comprising a continuous system of making fasteners in which the strip can be provided with female fastener elements on the surface opposite the surface containing the male fastener elements.

The process according to the invention is characterized in that a strip is formed comprising several flat longitudinally extending zones connected by longitudinal ribs whose base comprises two legs forming between them a longitudinal channel. The ends of said legs are integral at their edges with regard to two contiguous flat zones. The longitudinal ribs are cut transversely throughout their height and length so as to form a plurality of segments comprising individual ribs and openings in the strip defined by the two flat continuous zones and by two successive rib segments.

The resulting fastener element comprises a strip having on one of it's faces a plurality of fastener elements. This arrangement is characterized in that the strip is formed with several flat longitudinal zones connected to one another by aligned fastener elements. Said fastener elements include a base formed with two legs the ends of which are integral at their edges in relation to two flat contiguous zones. The fastener elements include in transverse cross-section, an enlarged top having a width greater than the space between the flat zones and being separated longitudinally a distance at least equal to their longitudinal dimension, in such a way as to arrange openings defined by two successive fastener elements and by two flat contiguous zones, susceptible of receiving identical fastener elements introduced from the face of the strip not provided with a fastener element.

The attached drawing shows schematically and by way of example, several forms of execution of means for carrying out the method according to the invention, as well as fastener arrangements resulting from the method FIG. 1 shows the head of a piece of equipment for extruding plastic material.

Figure 1:
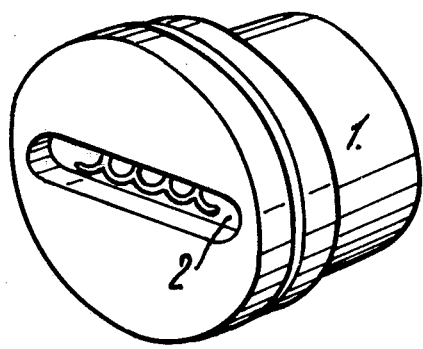
Figure 2:
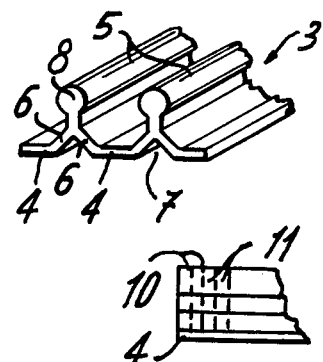
FIG. 2 is a perspective view of a portion of a formed strip.
Figure 3:
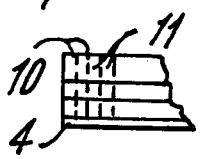
FIG. 3 is a side view of the strip shown in FIG. 2.

Referring to the drawings in detail, the head 1 of the plastic extrusion equipment shown in FIG. 1, is provided with an opening 2 designed for the extrusion of continuous shaped strip 3. The strip 3 comprises flat longitudinal zones 4 connected by longitudinal ribs 5. The base of each rib 5 is separated into two legs 6,6, forming between them a longitudinal channel 7. The ends of the legs 6,6 are integral at their edges with regard to two contiguous flat zones 4,4. The top of the rib 5 comprises a bulbous ridge 8 whose transverse dimension is greater than the transverse space between the two longitudinal flat zones 4,4, in order to form an expanded or enlarged top 13. The ribs 5 of the shaped strip obtained by extrusion are next cut transversely throughout their height to form segmented ribs 11 as shown in dotted lines in FIG. 3 which shows the lines 10 along which the ribs 5 are cut.

Figure 4:
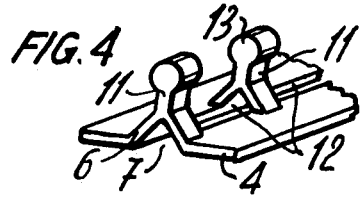
FIG. 4 is a perspective view of a portion of one form of fastener.

At the time of cutting the ribs 5, there are formed openings 12 defined transversely by two flat contiguous zones 4 and longitudinally by two successive rib segments 11. The strip is then drawn longitudinally, preferably while being heated, in order to obtain, after stabilization of the plastic material, the arrangement according to FIG. 4. The drawing or stretching of the strip is carried out until the longitudinal dimension of the openings 12 is greater than the length of the segments of the rib 11. The openings 12 are adapted to receive the enlarged tops 13 of the rib segments 11 of an identical fastener, the latter being introduced into the openings 12 from the face of the band not provided with ribs.

It will be apparent that the strip formed by the above described procedure presents on one of it's faces male fastening elements and on the base of the strip, openings 12 comprising the corresponding female fastening elements.

The size of the enlarged tops 13 of rib segments 11 being larger than the space between two flat zones 4, the connection of the rib segments 11 into the opening 12 is assured by the proper elasticity of the fastener arrangement whose zones 4 spread apart elastically when put in place.

Figure 5:
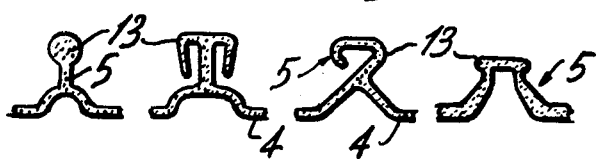
FIG. 5 is a view partly in section of several variations of strip shapes.

FIG. 5 shows a transverse section of a portion of four types of shaped strips which could be obtained by extrusion of a plastic material. In these four variations, the top of the rib 5 includes an enlargement 13 whose transverse dimension is greater than the space separating two flat contiguous zones 4.

Figure 6:
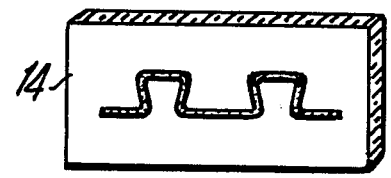
FIG. 6 is a perspective view of a drawplate.
Figure 7:
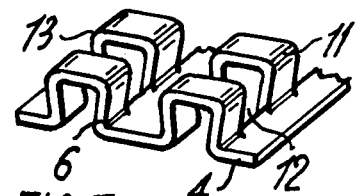
FIG. 7 shows a fastener means resulting from a strip extruded from the drawplate shown in FIG. 6.

The fastener arrangement shown in FIG. 7 is obtained by forming a strip extruded from the drawplate 14 shown in FIG. 6. This fastener means comprises segments 11 in the form of a U whose legs 6 are integral at their edges in relation to contiguous flat zones 4. These rib segments 11 widen towards their top in order to form enlargements 13 susceptible of being engaged with openings 12 in a corresponding strip.

Numerous modifications of the invention could be provided. For example, the cuts in the ribs could be made obliquely in relation to the longitudinal direction of the strip, so as to obtain the rib segments spaced as shown in FIG. 8.

Figures 8, 9:
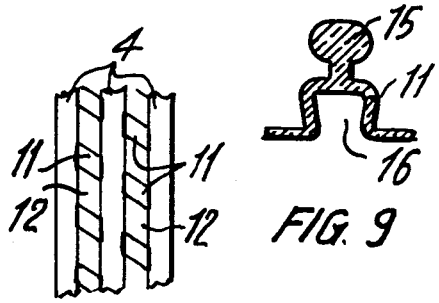
FIG. 8 is a partial plan view of an arrangement according to the invention.
FIG. 9 is a partial section of a modified form of fastener.

There could also be provided, as shown in FIG. 9, an enlargement 15 at the top of the rib segments 11 for an arrangement of fastener means of the type described in FIG. 7. This enlargement is preferably intended to cooperate with recess 16 in a corresponding rib segment.

Figure 10:
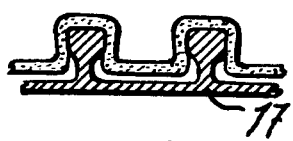
FIG. 10 shows a transverse sectional view of a fastener arrangement connected with the face of the strip without protuberances.

It is clear that the fastener means described above are not only intended to cooperate with each other but could very well be arranged opposite appropriate shaped elements 17, as shown in FIG. 10.

I claim:

1. Fastener means comprising, a strip having on a first one of its faces a plurality of longitudinally aligned and spaced apart upstanding fastener segments, said strip including a plurality of flat longitudinal zones disposed on both sides of said aligned fastener segments, said segments including a base comprising two legs whose ends are integral at their edges relative to two contiguous ones of said flat zones, said strip having spaced openings extending therethrough intermediate said spaced apart fastener segments, said fastener segments including an enlarged top of greater size than the lateral extent of said openings between the flat zones and being longitudinally spaced from each other a distance at least equal to their longitudinal dimension, so as to define said openings by two successive fastener segments and two contiguous uncut flat zones with said openings adapted to receive identical said fastener segments from the other of its faces.

2. Means according to claim 1 wherein the top of the fastener elements is of generally bulbous shape.

3. Means according to claim 1 wherein said individual fastener elements on one face of said strip comprise male members which are adapted to engage with said spaced openings comprising female members.

4. A method of manufacturing a fastener device comprising: extruding thermoplastic material to provide a strip having a plurality of longitudinally extending rows of ribs projecting from one face of said strip, forming said strip with a plurality of flat longitudinal zones connected to said rows of longitudinal ribs by two legs forming between them a longitudinal channel, the ends of said legs being integral at their edges with two contiguous flat zones, said longitudinal ribs provided with an enlarged top of a size greater than the space between adjacent ones of said flat zones, cutting said ribs transversely throughout their height down to the top surface of said flat longitudinal zones without cutting said flat zones to form a plurality of rib segments, stretching said strip to permanently elongate it and increase the longitudinal dimension between said rib segments and said stretching step forming elongated openings through said strip each defined by two contiguous uncut flat zones and by two successive rib segments with the longitudinal dimension of said openings being at least equal to the length of the rib segments.

5. A method according to claim 4 wherein said cutting of said ribs is effected perpendicularly with reference to the longitudinal direction of the strip.

6. A method according to claim 4 wherein the cutting of said ribs is effected obliquely with reference to the longitudinal direction of the strip.

7. A method according to claim 6 including forming the enlarged top of said ribs in the general shape of a bulb.

* * * * *